(12) United States Patent
Edvardsson

(10) Patent No.: US 7,345,622 B2
(45) Date of Patent: Mar. 18, 2008

(54) TWO-MODE RADAR LEVEL GAUGE SYSTEM

(75) Inventor: Olov Edvardsson, Linköping (SE)

(73) Assignee: SAAB Rosemount Tank Radar AB, Gothenburg (SE)

( * ) Notice: Subject to any disclaimer, the term of this patent is extended or adjusted under 35 U.S.C. 154(b) by 253 days.

(21) Appl. No.: 11/251,091

(22) Filed: Oct. 14, 2005

(65) Prior Publication Data
US 2007/0085729 A1    Apr. 19, 2007

(51) Int. Cl.
G01S 13/08 (2006.01)
(52) U.S. Cl. .................... 342/124; 342/175; 73/290 R
(58) Field of Classification Search ................ 342/124, 342/123, 118, 175; 73/290 R
See application file for complete search history.

(56) References Cited

U.S. PATENT DOCUMENTS

| | | | |
|---|---|---|---|
| 4,489,601 A | 12/1984 | Rao et al. ...................... 73/290 |
| 4,777,457 A * | 10/1988 | Ghosh et al. ................ 333/110 |
| 4,777,459 A * | 10/1988 | Hudspeth .................... 333/135 |
| 4,802,234 A * | 1/1989 | Tatomir et al. ............. 333/211 |
| 6,202,485 B1 * | 3/2001 | Wien et al. ................ 73/290 R |
| 6,499,346 B1 * | 12/2002 | Wien et al. ................ 73/290 R |
| 6,795,015 B2 | 9/2004 | Edvardsson ................. 342/124 |
| 6,915,689 B2 | 7/2005 | Edvardsson .................. 73/290 |
| 7,106,248 B2 * | 9/2006 | Janitch et al. ............. 342/124 |
| 2004/0099058 A1 * | 5/2004 | Edvardsson .................. 73/290 |
| 2004/0145510 A1 * | 7/2004 | Edvardsson .................... 342/5 |
| 2007/0085729 A1 * | 4/2007 | Edvardsson ................ 342/124 |

OTHER PUBLICATIONS

"International Search Report" for PCT/SE2006/001157.

* cited by examiner

Primary Examiner—John B Sotomayor
(74) Attorney, Agent, or Firm—Westman, Champlin & Kelly, P.A.

(57) ABSTRACT

A radar level gauge system for gauging the level of a filling material in a container is disclosed. The system comprises a waveguide extending towards the surface of said filling material; a transmitter for transmitting a microwave signal of a first mode of propagation in the waveguide; and a receiver for receiving the microwave signal reflected against the surface of the filling material and propagating back through the waveguide. Further, it comprises a processing circuitry for determining the filling level of the container based on the reflected microwave signal; and a transition element connecting the waveguide and the transmitter, wherein the transition element is configured to allow a part of the transmitted microwave signal to leak into a second mode of propagation. The first and second modes of propagation are within a frequency band which admits propagation of said microwave signal in the two different modes of propagation in the waveguide, wherein the receiver is arranged to receive the microwave signal in the at least two different modes of propagation.

23 Claims, 5 Drawing Sheets

US 7,345,622 B2

TWO-MODE RADAR LEVEL GAUGE SYSTEM

FIELD OF THE INVENTION

The present invention relates generally to radar-based level gauging, and more specifically the invention relates to systems and methods for radar-based level gauging of the level of a filling material, and in particular a liquid, through a waveguide at high accuracy without prior knowledge of the exact gas composition and/or pressure above the surface of the filling material.

TECHNICAL BACKGROUND

Radar level gauge systems for measuring the level of a liquid or other filling materials in a container are well-known, and such a system generally comprises a transmitter for transmitting a microwave signal towards the surface of the liquid, a receiver for receiving the microwave signal reflected against the surface of the liquid, and a signal processing device for calculating the level of the liquid in the container from the propagation time of the transmitted and reflected microwave signal. Such device has become more and more important, particularly for petroleum products such as crude oil and products manufactured from it. By containers is here meant large containers constituting parts of the total loading volume of a tanker, or even larger usually circular-cylindrical land-based tanks with volumes of tens or thousands of cubic meters.

One factor enabling a high accuracy for radar level gauging system is that the velocity of the radar waves usually is well known or equal to the velocity of light in vacuum (299 792 458 m/s) divided by the square root of the dielectric constant of the gas (close to 1.0006 for normal air). However, for some applications the dielectric constant is not known sufficiently accurate to obtain a desired high accuracy.

In one particular kind of radar-based device for gauging the level of a liquid in a container the microwave signal is transmitted, reflected and received through a waveguide, such as a vertical steel tube mounted within the container, which acts as a waveguide for the microwaves on their way to and from the liquid surface. However, a problem in such systems is that the gas above the surface of the liquid reduces the velocity of the microwaves. This velocity reduction may be accurately estimated, but only if the gas composition, temperature and pressure are known, which is normally not the case.

A solution to the above-discussed problem is presented in U.S. Pat. No. 6,915,689 by the same applicant. This document inter alia describes a method for pipe measurement where the dielectric constant of the gas has a negligible or very small influence on the distance seen as the measured value. The method is typically intended for LPG measurements where CTS accuracy is required and where the dielectric constant can vary in the range 1.00-1.02 (air Lo pressured propane), in contrast to ordinary radar methods where the wavelength in the used atmosphere is known and can be used as the standard. By CTS (Custody Transfer Safety) is understood systems with a very high accuracy, such as ±2 mm over 20 m distance, which are certified by for instance an authority in order to be allowed for official or commercial measuring use. As described in U.S. Pat. No. 6,915,689 the problem with the not sufficiently known dielectric constant can be solved, but at the expense that the accurate measurement will depend on the diameter of the pipe instead of on the velocity of the radar waves. The diameter of the steel pipe has enough stability (incl. a temperature correction) to be used as a standard but the initial determination of the diameter might present a problem including the fact that the diameter may vary slightly (say +/−0.5%) along the pipe. The pipe typically has a length of 25 m, provided in 6 m sections that are welded together. Thus, an exact estimation of the diameter is difficult.

When ordinary petroleum products are used, i.e. such that are fluent at usual temperatures, the gas in the tube is typically air. The nominal dielectric constant in air is 1.0006 with a typical variation of +−0.0001. The tank content would, however, increase the dielectric constant over that of air in case of evaporation of hydrocarbons etc. Such increase may be notable. Further, when to gauge the level in a container that contains a liquefied gas under overpressure the change in velocity is highly notable. Among the common hydrocarbon gases propane has among the highest dielectric constant causing about 1% velocity decrease at a pressure of 10 bar (corresponding to $\in=1.02$). Such large discrepancy is in many applications, such as in custody transfer (CTS) applications, not acceptable. A higher accuracy, defined as custody transfer accuracy, is thus often needed. By the expression custody transfer (CTS) accuracy is herein meant an accuracy sufficient for a possible approval for custody transfer, which is a formal requirement in many commercial uses of level gauging. In terms of propagation velocity custody transfer accuracy may imply an accuracy in determination of the level in the range of about 0.005-0.05%.

U.S. Pat. No. 6,915,689 further discloses the use of two different propagation modes in order to more accurately estimate the pipe diameter, and to take corrective actions accordingly. Different modes propagate with different speed, which makes it difficult to make measurements when several modes are present. Therefore, several simultaneous modes are normally avoided in radar level gauging. However, in U.S. Pat. No. 6,915,689 use of several modes is considered in order to provide estimates on environmental conditions, and in particular the pipe diameter.

However, a problem with the solution taught by this document is that it requires a rather complex feeding system in the transmitter in order to provide the different modes of the microwave signals, which increases the system complexity, cost and difficulty of use.

It is therefore a need for a simpler and/or more cost effective solution, which still provides at least about the same degree of accuracy and reliability in regard of the measurement results.

SUMMARY OF THE INVENTION

It is therefore an object of the present invention to overcome, or at least alleviate, the above-discussed problems. This object is fulfilled by means of a radar level gauge system and method according to the appended claims.

According to a first aspect of the invention, there is provided a radar level gauge system for gauging the level of a filling material in a container, comprising:

a waveguide extending towards the surface of the filling material;

a transmitter for transmitting a microwave signal of a first mode of propagation in the waveguide;

a receiver for receiving the microwave signal reflected against the surface of the filling material and propagating back through the waveguide; and processing circuitry for determining the filling level of the container based on the reflected microwave signal; and a transition element connecting the waveguide and the transmitter, wherein the transition element is configured to allow a part of the transmitted microwave signal to leak into a second mode of propagation;

wherein the first and second modes of propagation are within a frequency band which admits propagation of the microwave signal in the two different modes in the waveguide, and wherein the receiver is arranged to receive the microwave signal in the at least two different modes of propagation.

The inventive radar level gauge system provides a simple solution to calculate an accurate average diameter over the part of the pipe which is currently used, by measuring the distance in two ways by using two waveguide modes. Two-mode measurement is per se known from U.S. Pat. No. 6,915,689, which document is hereby incorporated by reference. Thus, the present invention provides a radar level gauge system with essentially the same capacity and performance as in the previously known system, but with significantly simplified feeding means, whereby a simplex and more cost-effective system is obtainable.

By means of the present invention, a cost effective and reliable apparatus for high accuracy gauging of the level of a liquid in a container can be obtained. The apparatus is particularly useful in environments where there exists a gas having a dielectric constant within a predetermined dielectric constant range above the liquid surface to be measured. The liquid can e.g. be comprised of a condensed gas and the gas be comprised of the condensed gas in gaseous phase, which condensed gas is stored in the container at overpressure.

The waveguide is e.g. a tube which extends towards the surface of a liquid to be measured, wherein the walls of the tube is provided with a number of holes so that the liquid in the container can flow laterally in and out of the tube to maintain a unitary level of the liquid inside and outside the tube. The waveguide may have any type of cross section, but preferably a rectangular or circular cross section. The tube diameter is preferably within the range 25-150 mm, and most preferably within the range 50-100 mm.

Pipe diameter and operating frequency are preferably chosen so that the group velocities of microwave signals in the first and second modes of propagation in the waveguide are essentially independent of the dielectric constant, at least within a predetermined dielectric constant range.

The receiver may distinguish portions of the microwave signal received in different ones of the first and second modes of propagation in various ways, but e.g. based on the different arrival times at the receiver for the reflected microwaves signals of the different modes of propagation.

The microwave signal may be a frequency modulated continuous wave signal (FMCW) or a pulsed radar signal.

The invention is particularly useful for gauging the level of a liquid in a container, above which level a gas exists, wherein the waveguide extends through the gas towards the surface of the liquid.

Preferably, the first mode is a $H_{01}$ mode, and the second mode is a $H_{02}$ mode. In this case, the waveguide preferably has a dimension that will not allow a $H_{03}$ mode to pass. The microwave signal frequency can e.g. be within the range 5-25 GHz.

The transition element is preferably configured to leak 20-80% of the microwave power to the second mode of propagation, and most preferably Lo leak 40-60%.

The transition element can advantageously be formed essentially as a cone. In order to obtain a suitable leakage into the second mode of propagation, the length of the transition element in the axial direction is preferably rather short, and e.g. less than 0.25 m. Preferably, the length of the transition element in the axial direction is within the range 0.05-0.10 m. In the prior art, rather long cones have been used to avoid excitation or more than one propagation mode, but here excitation of more than one mode is used.

The processing circuitry is preferably arranged to estimate from the reflected microwave signal in each mode of propagation one or more properties of the waveguide or of the environment in the container, and to use the estimate of the one or more properties to calculate a corrected level of the filling material in the container. The processing circuitry may be arranged as one single unit, or be arranged in distributed form, comprising several units, which are possibly arranged separated from each other. The one or more properties of the waveguide or of the environment in the container can e.g. comprise a cross-sectional dimension of the waveguide, a variation in a cross-sectional dimension along the length of the waveguide, a concentricity measure of the waveguide, presence of impurities, particularly solid or liquid hydrocarbons, at the inner walls of the waveguide, or presence of mist in the tank.

In a line of embodiments, the processing circuitry calculates a cross section dimension of the waveguide based on the received and distinguished portions of the microwave signal received in different ones of the first and second modes of propagation. Preferably, the waveguide has a circular cross section and the cross section dimension calculated is the average diameter of the waveguide along the distance the microwave signal propagates before being reflected against the surface of the liquid.

However, alternatively the processing circuitry determines the distance to the filling material surface for each of the two modes of propagation, resulting in two parallel series of measurement values. These two measurement series can then be used for generating an aggregated value, such as a mean value, which is independent on the tube or pipe diameter, and which is unaffected by variations in the diameter along the tube/pipe.

To ensure highest accuracy it is desirable to have one or two mechanically fixed reflections in the pipe and typically said two fixed reflections can correspond to the states "empty tank" and a know position above "full tank". The "empty tank" reflection is preferably done as described in U.S. Pat. No. 6,795,015, which document is hereby incorporated by reference, where the reflector is nearly invisible while submerged but distinct when the liquid surface is below the reflector. The "full tank" reflector is preferably arranged to reflect only one of the modes.

A reflecting reactance can be arranged in the waveguide to give a substantially stronger reflex of the microwave signal in one of the at least two different modes of propagation than in an other one of the at least two different modes of propagation.

According to another aspect of the invention, there is provided a method for gauging the level of a filling material in a container, comprising the steps of:

transmitting a microwave signal of a first mode of propagation through a waveguide towards the surface of the filling material;

receiving the microwave signal reflected against the surface of the filling material and propagating back through the waveguide; and determining the filling level of the container based on the reflected microwave signal, wherein:

a part of the transmitted microwave signal is allowed to leak into a second mode of propagation, both the first and the second mode being within a frequency band which admits propagation of the microwave signal in the waveguide; and the microwave signal is received in the two different modes of propagation.

In accordance with this aspect of the invention, advantages and variations are obtainable which are analogous and similar to the ones discussed above in relation to the first aspect of the invention.

These and other aspects of the invention will be apparent from and elicited with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

Figure 1:
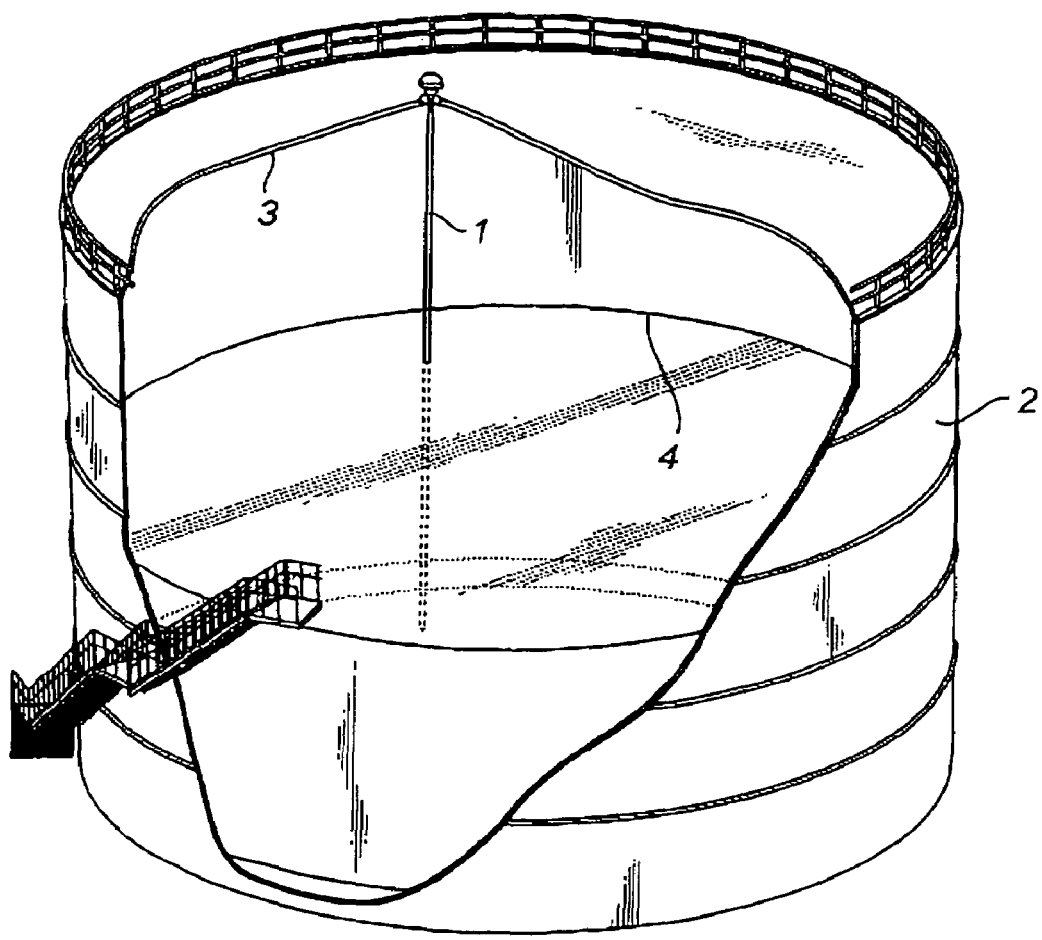
FIG. 1 is a schematic cross-sectional side view of a container, in which an radar level gauge system according to an embodiment of the present invention is arranged.
Figure 2:
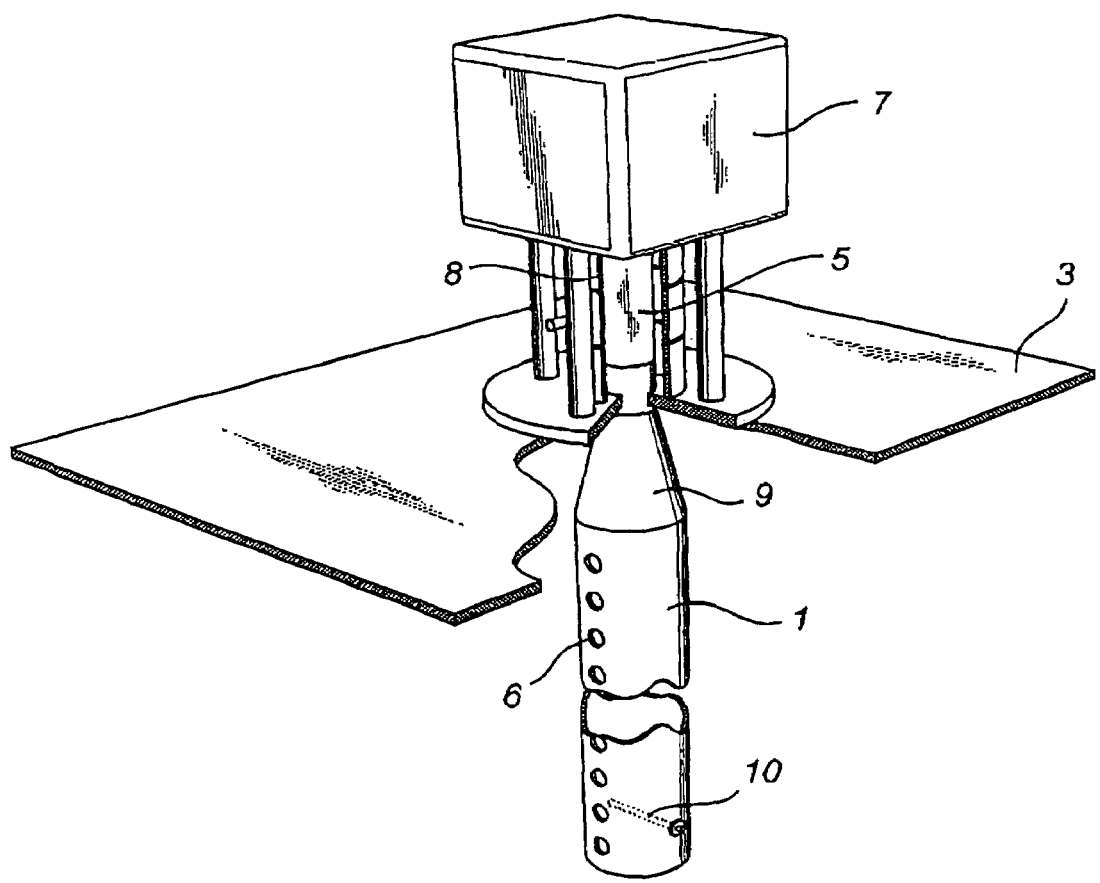
FIG. 2 illustrates schematically, in a perspective view, the device for radar-based level gauging of FIG. 1 in greater detail.

FIGS. 1 and 2 shows schematically a radar level gauge (RLG) system 1 according to an embodiment of the present invention. The system may be a frequency modulated continuous wave (FMCW) RLG system or a pulsed RLG system or any other type of distance measuring radar, but is preferably the former. The RLG system may have a capability of transmitting a microwave signal at a variable frequency, which is adjustable.

The RLG system comprises a waveguide 1, in the form of a substantially vertical tube or tube that is rigidly mounted in a container 2, the upper limitation or roof of which is designated by 3. The container contains a liquid 3, which may be a petroleum product, such as crude oil or a product manufactured from it, or a condensed gas, which is stored in the container at overpressure and/or cooled. Propane and butane are two typical gases stored as liquids.

The waveguide 1 is preferably of a metallic material to be capable of acting as a waveguide for microwaves and may have an arbitrary cross-sectional shape. However, a circular, rectangular, or super-elliptical cross-section is preferred. The tube is not shown in its entire length but only in its upper and lower portions. The tube is provided with a number of relatively small openings 6 in its wall, which makes possible the communication of the fluid from the container to the interior of the tube, so that the level of the liquid is the same in the tube as in the container. The size and locations of the holes are chosen so that they do not disturb the wave propagation but still allow the interior and exterior liquid level to equalize sufficiently fast.

A unit 7 is rigidly mounted thereon. This unit 7 comprises a transmitter, not explicitly shown, for feeding a microwave signal, a receiver for receiving the reflected microwave signal, and a signal processing device for determining the reflect position of the reflected microwave signal.

The transmitter comprises a transmitter waveguide, designated by 5 in FIG. 1, which is surrounded by a protection tube 8. The waveguide 5 passes via a transition element 9, such as a conical middle piece, over to the waveguide 1.

The transition element 9 is arranged both to provide a transition and a waveguide connection between the transmitter waveguide 5 and the waveguide 1 within the tank. However, in addition the transition element is configured to allow a part of the transmitted microwave signal to leak from a first mode of propagation provided by the transmitter and into a second mode of propagation. Hereby, two modes are transmitted through the waveguide simultaneously. Preferably, the transmitter provides a $H_{01}$, which leaks into the $H_{02}$ mode in the transition element. However, the transition element is preferably adapted to inhibit $H_{03}$ and higher order modes, or at least to induce only relatively low amounts of such modes.

The transition element is preferably arranged to provide essentially the same amount of microwave power in both modes of propagation.

The first and second modes are preferably chosen to be within a frequency band, at which the group velocities of microwave signals in the first and second modes of propagation in the waveguide are essentially independent of the dielectric constant, at least within a predetermined dielectric constant range. In the preferred embodiment the frequency and diameter is chosen to allow the dielectric constant to have a negligible influence on the $H_{02}$ mode while the $H_{01}$ mode at the same frequency is more influenced. Radar level gauges use a rather wide bandwidth (the width may be 10-15% of the center frequency) and the propagation is characterized by the group velocity in the middle of that band. Here, a frequency band and mode propagation of the transmitted and received microwave signals, and of the inner dimension of the tube, are preferably selected to obtain a group velocity of the microwave signal, which is fairly constant over an interesting range of dielectric constant values, preferably between 1.00 and 1.03. Such a selection is per se previously known from U.S. Pat. No. 6,915,689, which is hereby incorporated by reference.

The transition is preferably realized as a tubular part with, in the axial direction, a gradually increasing inner cross-section area, which increases from the inner cross-section area of the transmitter waveguide 5 to the inner cross-section area of the tube waveguide 1. Further, the transition element is preferably rotationally symmetric. Most preferably, the transition element is formed essentially as a cone. In order to obtain a suitable leakage into the second mode, the length of the transition element in the axial direction is preferably rather short, and e.g. less than 0.25 m. Preferably, the length of the transition element in the axial direction is within the range 0.05-0.10 m.

In operation the transmitter generates a microwave signal of a first mode, which is fed through the transmitter waveguide 5 and the conical transition element 9, whereby a leakage into a second mode occurs, and into the waveguide 1. The microwave signal propagates in the tube of the waveguide 1 towards the surface to be gauged, is reflected by the surface and propagates back towards the receiver. The reflected signal passes through the conical transition element 9 and the waveguide 5, and is received by the receiver. The receiver may distinguish portions of the microwave signal received in different ones of the first and second modes of propagation in various ways, such as based on the different arrival times at the receiver for the reflected microwaves signals of the different modes of propagation. The signal processing device then calculates the level of the liquid from the round-trip time of the microwave signal. In addition, the processing circuitry can be arranged to estimate from the reflected microwave signal in each mode of propagation one or more properties of the waveguide or of the environment in the container, and to use the estimate of the one or more properties to calculate a corrected level of the filling material in the container, such as a cross section dimension of the waveguide as an average diameter of the waveguide along the distance the microwave signal propagates before being reflected against the surface of the liquid.

For calibration, one or several zero reflection reflectors 10 may be used, which are preferably adapted to provide reflections only for one of the modes and not the other, such for $H_{01}$ and not for $H_{02}$. Such reflectors may be arranged on various heights in the waveguide 1. In addition, a reflector may be arranged in the bottom of the tank for calibration when the tank is empty. Preferably, a lower and an upper reflector are used, where the upper is visible and may be used for a function control, and the lower may be used for start-up calibration and empty tank testing. The top reflector is preferably arranged to provide different reflections for the two modes, even though thus is not absolutely necessary. The bottom reflector is preferably arranged to provide the same amount of reflection in both the modes. However, the bottom reflector is preferably arranged to provide an essentially stronger reflection when not covered by a liquid than if it is covered. Such reflectors are per se previously known from U.S. Pat. No. 6,795,015, which is hereby incorporated by reference. Thus, such a two reflector configuration is fully sufficient for essentially all calibration needs, and consequently, no other reflectors at other levels would thereby be necessary.

Figure 3:
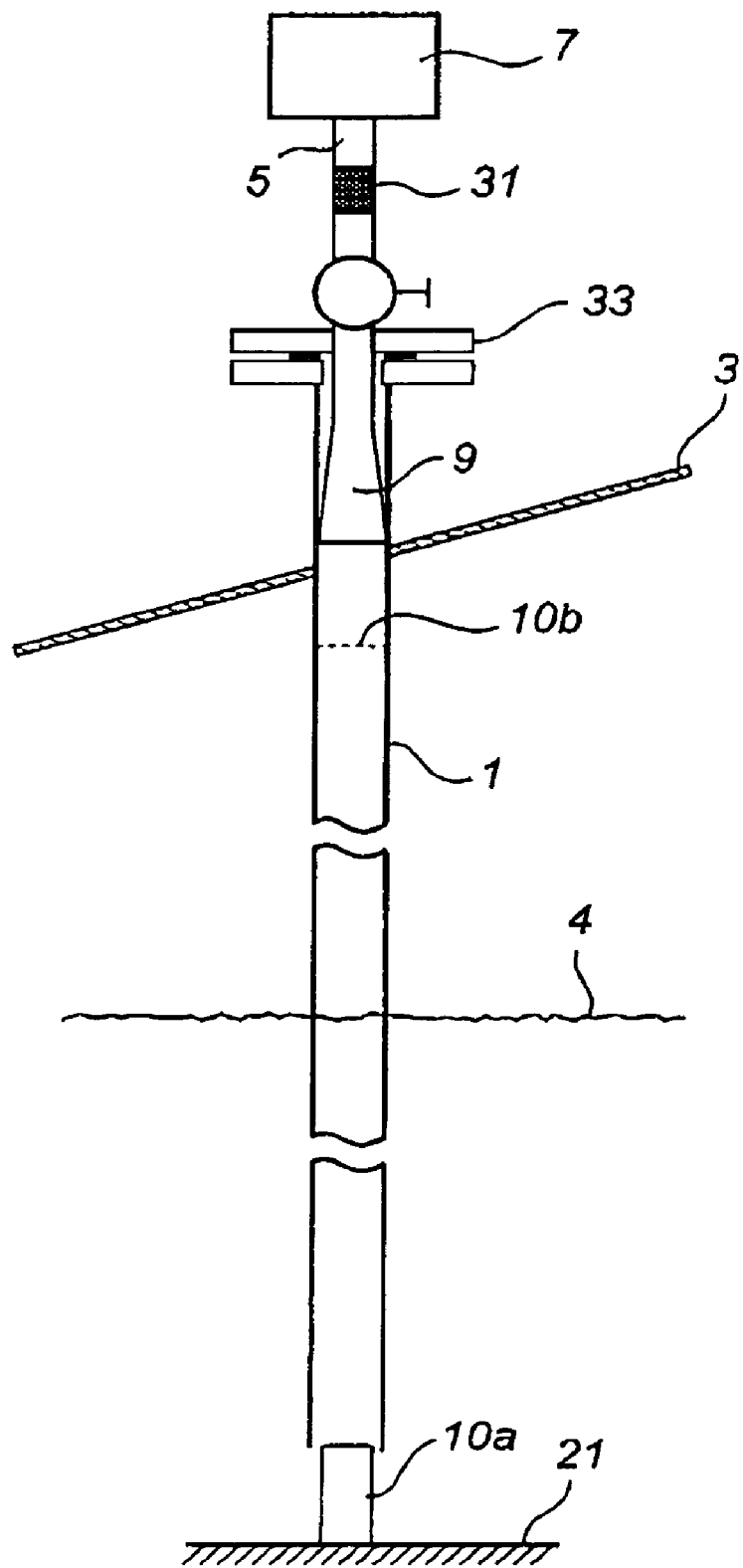
FIG. 3 is a schematic cross-sectional side view of the radar level gauge system of FIG. 1.

FIG. 3 is a schematic overview of the radar level gauge system of FIG. 1, to illustrate features of interest along the pipe. The electronic unit 7 creates an output in the waveguide 5 which is converted to a $H_{01}$ mode in a mode generator or the like, in which $H_{01}$ is the highest propagating mode or where $H_{02}$ cannot propagate. In said waveguide or above, a sealing 31 may be provided, which is preferably made for a high pressure if the tank is to be used for pressurized gas. A ball valve 32 may also be provided for safety reasons, and it can be used for instance if the sealing have to be changed. The transition element 9 providing the transition to the pipe diameter of the waveguide 1 is arranged below the ball valve, and can typically be made of a straight cone with a suitable length. A pressurized tank is typically spherical in shape and this the highest liquid level—a few % in volume below a completely full tank—is not very close to the top of the tank. In that space, a reflector 10b may be located for a calibration slightly above the practical top level. This reflector is in a preferred embodiment arranged to reflect $H_{01}$ in about the same way as the typical liquid surface, but to reflect $H_{02}$ to a much lower degree, or even not at all. The waveguide 1 preferably extends close to vertically through the tank, and is slightly perforated, e.g. by 2 holes per meter and each having a diameter of 10 mm. The pipe ends a few cm or a few dm above the tank bottom 21 to allow worst case thermal movements. A bottom reflector 10a may be fixed to the bottom, which is preferably arranged to provide a very small reflection when the reflector is submerged and a reflection comparable to that of the liquid surface when the liquid level exposes the reflector.

FIG. 4 shows some exemplary embodiments of high level reflectors 10b having significantly different reflection for the two used modes. The top reflector can be made in several ways and preferably in a way that reflects $H_{01}$ but not $H_{02}$. For $H_{01}/H_{02}$ the reflector can have the shape of a thin metal ring or the like attached to the pipe by radial metallic pins. The ring is located at a radius where $H_{02}$ has zero circumferential field and thus the $H_{02}$ reflection is small while $H_{01}$ has a strong reflection which can be decreased to a suitable level by a thin geometry. The metallic radial attachment has no influence on the $H_{01}/H_{02}$ modes if made sufficiently thin.

Figure 4A:
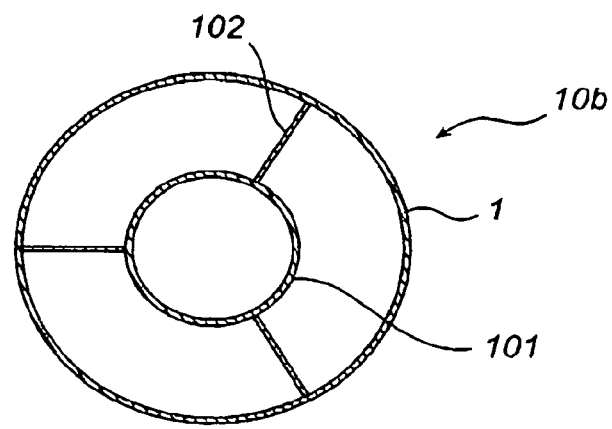
FIG. 4 is an exemplary embodiment of a bottom reflector.

In a first exemplary embodiment, as shown in FIG. 4a, the reflector 10b comprises a horizontal ring 101 in the waveguide 1 supported by radial pins 102. The radial pins will not affect the field pattern of $H_{01}$ or $H_{02}$ and are chosen in number and location for good mechanical stability. If the diameter of the ring is 55% of the pipe diameter (or 54.62%) the location of the ring is where the circumferential electric field of $H_{02}$ is zero and consequently $H_{02}$ is not affected at all by the shown structure (ie no reflection from $H_{02}$) The geometry of the reflector makes a mounting in a joint of the pipe the preferred method.

Figure 4B:
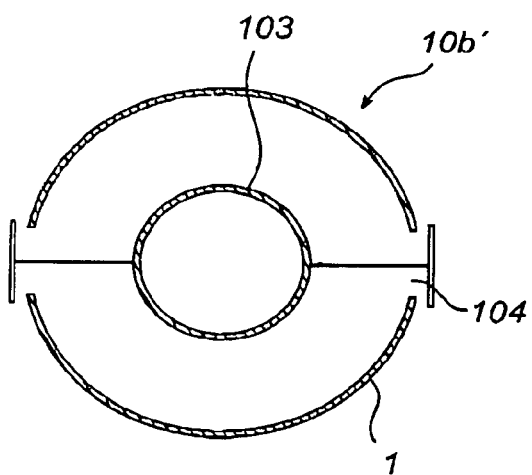

Another way to implement the top reflector is illustrated in FIG. 4b. In this embodiment, the reflector 10b' comprises a thin steel ribbon 103 which can be temporary bent to be inserted through a hole 104 in the pipe 1. The geometry and function thus is similar to the embodiment discussed in relation to FIG. 4a, but by the method of inserting the reflector can be mounted through holes i.e. without regard to joints and the like.

Figure 4C:
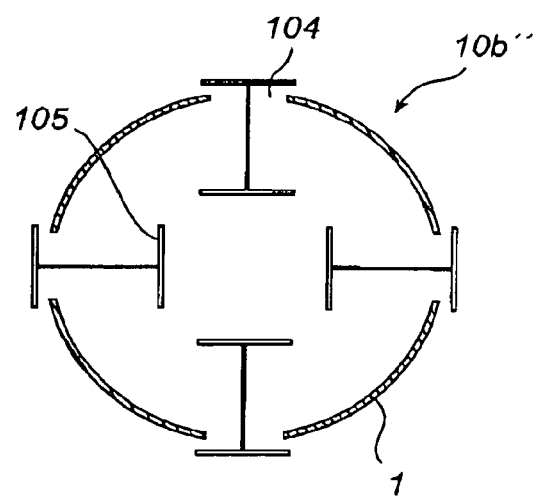

Yet another way to implement the ring, in terms of function with regard to $H_{01}$ and $H_{02}$, is illustrated in FIG. 4c. In this embodiment, the reflector 10b" comprises a ring that is split in a number or half-wave dipoles 105 directed circumferential in the metallic ring. All the half-wave reflectors 105 may be attached to a support (not shown) around the pipe and inserted through holes 104 in the waveguide pipe 1, as in the examplary embodiment of FIG. 4b. The half-wave reflectors may e.g. be 15 mm long when a frequency of 10 GHz is used, and can be formed of thin metal sheets or fingers. Preferably, the half-wave reflectors are made at least somewhat flexible, whereby insertion into smaller holes in the waveguide pipe is rendered possible. It is to be noted that the embodiment with 4 half-wave reflectors is merely an example, and other numbers of half-wave reflectors, such as 2, 3 or 6, are equally feasible.

Figure 5:
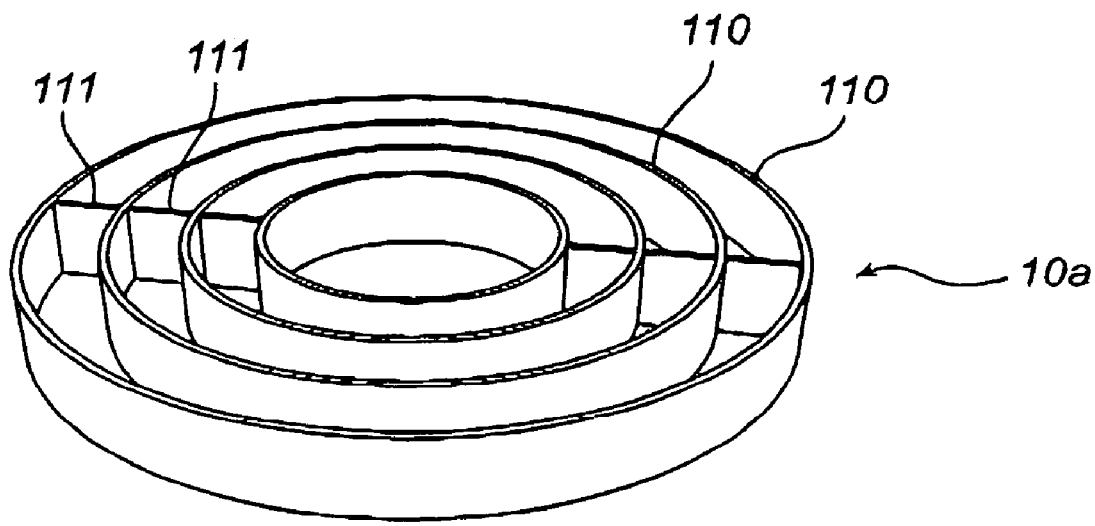
FIG. 5 illustrates some exemplary embodiments of a full tank reflector.

FIG. 5 is an example of reflector 10a that may be used as a bottom reflector in the above-discussed system. Such bottom reflectors are per se previously known from U.S. Pat. No. 6,795,015, said document hereby incorporated by reference.

In the exemplary embodiment of FIG. 5, the reflector is suitable to be arranged below or at the end of the waveguide pipe, and slightly above and attached to the bottom. The reflector comprises a number of metal rings 110 attached to radial supports 111. The rings will appear as a metallic surface for the circumferential electric field of the $H_{01}$ and $H_{02}$ waveguide modes which as a consequence will be reflected regardless of the possibly irregular structure of the bottom below the rings when the liquid is below the reflector. The distance between the rings is however matched to the dielectric constant of the liquid and when the rings are submerged waveguides are formed of the rings and by making the rings half a wavelength high the reflector will act as a radome transparent to waves of the used frequency.

Figure 6:
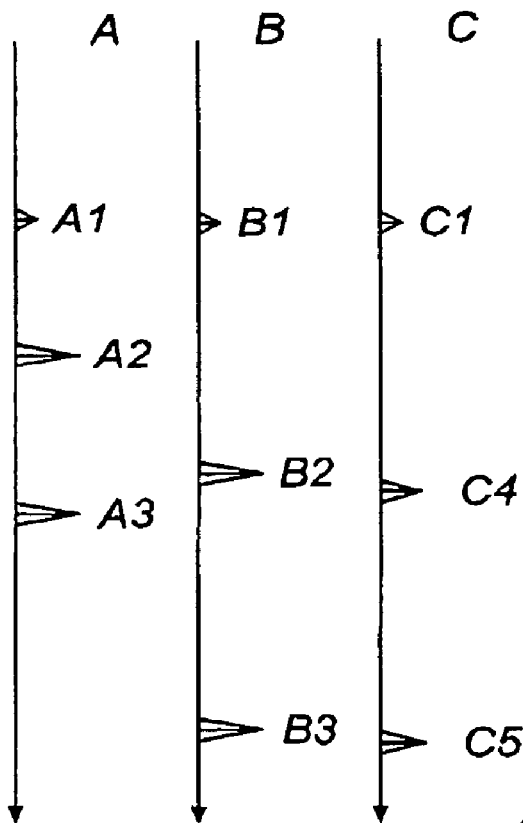
FIG. 6 is a schematic tank spectrum for some typical tank states.

FIG. 6 illustrates three exemplary tank spectrums receivable in the radar level gauge system of FIG. 3. In a first tank spectrum A, the situation with a medium liquid level in the tank is illustrated. In this case, the tank spectrum typically comprises a received echo signal A1 corresponding to the upper reflector 10b, a received echo signal A2 corresponding to the reflection of the $H_{01}$ mode on the liquid surface, and a received echo signal A3 corresponding to the reflection of the $H_{02}$ mode on the liquid surface. In a second tank spectrum B, the situation with a low liquid level in the tank is illustrated. In this case, the tank spectrum typically comprises a received echo signal B1 corresponding to the upper reflector 10b, at about the same position as A1, a received echo signal B2 corresponding to the reflection of the $H_{01}$ mode on the liquid surface, slightly lower than A2, and a received echo signal B3 corresponding to the reflection of the $H_{02}$ mode on the liquid surface, significantly lower than A3. In a third tank spectrum C, the situation with an essentially empty tank is illustrated. In this case, the tank spectrum typically comprises a received echo signal C1 corresponding to the upper reflector 10b, at the same level as A1 and B1, a received echo signal C4 corresponding to the reflection of the $H_{01}$ mode on the bottom reflector 10a, and a received echo signal C5 corresponding to the reflection of the $H_{02}$ mode on the bottom reflector 10a.

The theory behind the present invention, and the applicability of the two-mode measurement will now be discussed briefly. The following discussion is focused on FMCW, since CTS-accuracy in pipes so far have been difficult to obtain in pulsed system with pipes, but by slight modifications of this discussion it is equally applicable to pulsed systems. The typical IF (intermediate frequency) signal created by a linear sweep and a normal liquid surface has a nearly constant frequency with a fairly constant amplitude. The constant frequency (proportional to the distance) can be described as a phase with a linear growth during the sweep and a typical signal processor performs a least square matching of the phase growth to a straight line. When the measurement is done through a pipe rather than in free space, the phase will have a slightly unlinear variation during the sweep and this variation can be illustrated by the formula:

$$\varphi(k) = 2L\sqrt{k^2 \in -(2X/d)^2} \quad (1)$$

where:

k=wavenumber (=rescaled frequency) which for a 16% sweep around 10 Ghz varies over the range 193-227 m$^{-1}$ L=length of the pipe d=diameter of the pipe ∈=dielectric constant of the atmosphere ranging from 1.0006 for air and 1.02 for pressurized propane X is the applicable Bessel root which is 1.841 for $H_{11}$, 3.832 for $H_{01}$ and 7.016 for $H_{02}$.

As seen by eq (1) the phase has a slightly non-linear dependence of the frequency and the degree of non-linearity can be estimated by a parabolic curve matching rather than a linear. The degree of un-linearity can be expressed as an arc-height and calculated with good accuracy for the propagation in a pipe which is as close to cut-off as in this case. The arc-height can be used to calculate the pipe diameter as an average along the measured piece of the pipe. The "raw distance" L* is evaluated as the derivative:

$$L^* = 0.5 \frac{\partial \varphi(k)}{\partial k} = \frac{Lk\varepsilon}{\sqrt{k^2\varepsilon - (2X/d)^2}} \quad (2)$$

and the evaluation is typically done by a least square method and in case of a pipe L* is adjusted by a factor f close to 1. In practical terms, the following simpler estimation may be used giving L* as:

$$L^* = \frac{\varphi(k_1) - \varphi(k_2)}{2\Delta k} \quad (3)$$

where $k_1$ and $k_2$ are the endpoints of the sweep.

From (1) and (2) the variation of the measured distance with varying ∈ can be estimated as:

$$\frac{\partial L^*}{\partial \varepsilon} = \frac{\partial^2 \varphi(k, \varepsilon)}{2\partial k \partial \varepsilon} = \frac{kL(k^2\varepsilon - 2(2X/d)^2)}{(k^2\varepsilon - (2X/d)^2)^{1.5}} \quad (4)$$

When the upper parenthesis is zero the conditions for gas independence are fulfilled, which can also be formulated as a k corresponding to the centre frequency:

$$0.5 \, kd\sqrt{\in} = \sqrt{2}X \quad (5)$$

The pipe diameter enters the calculations by being the length reference so that accuracy in ppm of the diameter must be better than the desired distance accuracy in ppm. Thus any diameter measurement is useless (in a ppm-scale) and only rotational symmetric modes ($H_{0n}$ and $E_{0n}$) can be used to avoid influence of any deviation from ideal circular shape. To this end, the two simultaneous wave guide modes, preferably $H_{01}$ and $H_{02}$, can be used to obtain two L*, the difference between which is an accurate measure of the pipe diameter seen as an average over the actual path.

If the raw distance (from eq (2)) as measured by $H_{01}$ and $H_{02}$ is denoted $L^{01}$ and $L^{02}$ it can be shown that we can form an "average" $L^{FS}$ corresponding to free space:

$$L^{FS} = \frac{L^X L^Y \sqrt{Y^2 - X^2}}{\sqrt{(YL^Y)^2 - (XL^X)^2}} = L\sqrt{\varepsilon} \quad (6)$$

$L^{FS}$ is not dependent on diameter changes (either local or common) but is depending solely on the dielectric constant. L* as from eq (2) is on the other hand depending on the diameter but not on the dielectric constant. Starting with empty tank calibration recorded values of $L^{FS}$, L* and the arc-height, we can calculate a diameter profile over the measured part of the tank. Said diameter profile will be constant over the time (except for predictable temperature changes) and can subsequently be used to obtain CTS accuracy over the whole tank.

In addition, the two-mode measurement will take other environmental variations into account, such as temperature variations and thermal expansion of the used steel, and the influence of a possibly non-uniform pipe diameter. The pipe may be made from 6 m pieces which may have a diameter accuracy of +/-0.5%. $H_{11}$ or other polarized modes are preferably not used, since $H_{11}$ will have a polarization dependent velocity, and require essentially perfectly circular pipes.

The waveguide pipe is preferably chosen among available standards and allow the use of a frequency within the usable range. For example, a 2" SCH 40 can be used, having a nominal inner diameter of 52.5 mm. Taking ∈=1.01 as the average dielectric constant the centre frequency is preferably chosen as about 9781 MHz. This can be used for 30-40 m. Alternatively, a 3.5" SCH 10 pipe could be used, having an inner diameter of 95.5 mm and with the use of a centre frequency of about 9843 MHz to fulfill the gas independent condition of (5).

The pipe diameter is likely to vary a few tenths of a percent from piece to piece (typically 6 mm long) so deviations in the cm-range are not unlikely with worst case variations. Use of two modes of propagation is a stable method and preferably $H_{01}$ and $H_{02}$ are used simultaneously. Both modes of propagation are rotationally symmetric and thus insensitive to normal deviations (i.e. <1%) from mechanical circularity and can be created in the same mode converter structure.

The measurement with $H_{02}$ tuned to equation (5) will give 30% longer raw distance than a measurement by $H_{01}$ at the same frequency and diameter. In the simplified method of this invention, these modes are allowed simultaneously. These simultaneous modes are obtained by means of a transition element, such as a conical transition which is much shorter than by conventional design.

At least for distances bigger than around 2-3 m the two modes will appear as two well separated echoes which can be measured without disturbing each other. A mode converter which creates two modes simultaneous ($H_2$ and $H_{01}$) can be used and the most straightforward method is simply to use a conical transition 2" to 4" which is too short according to conventional design. Keeping the rotational symmetry only $H_{0n}$ modes will be generated by the short cone and a suitable diameter will restrict the generated modes to $H_{01}$ and $H_{02}$. Another way is to use a $H_{01}$-converter in combination with a rotationally symmetric mechanical disturbance.

The restriction for small distances will in most practical situations not be a severe restriction. For example in spheres of normal size, the 98% volume of a sphere occurs at $11/12$ of its diameter or 2 m below the top in a 24 m sphere. Degraded accuracy in level intervals which are not used is normally acceptable.

As a practical example of an embodiment of the present invention, a frequency of around 10 GHz may be assumed. In this case 2" 40 pipe can be used as the transmitter waveguide to reach the gas independent condition, and to feed the microwave signal in the $H_{01}$ mode. As the tube waveguide, at least for deeper tanks (40-50 m), a thicker pipe, such as 3.5" SCH 10 may be used. Then a conical transition from 2" SCH 40 to 3.5" SCH 10 can be used as the transition element. In order to obtain a suitable leakage into the second mode of propagation, a considerably shorter cone than obtained by standard is used, with the result that a known part of the microwave power (such as 50/50) is leaking to $H_{02}$. In this case, instead of a standard length of about 0.5 m (depending on exact shape), a 50-100 mm straight cone may be used to provide the desired mode mixture. The pipe diameter below the cone will not allow $H_{03}$ to pass and the rotational symmetry will not generate other modes than $H_{01}/H_{02}$. Thus, simply by a suitable short cone the desired mode mixing will occur.

Specific embodiments of the invention have now been described. However, several alternatives are possible, as would be apparent for someone skilled in the art. For example, many different components may be used for performing the various functions of the level gauge system and the processing circuitry, as would be readily apparent for someone skilled in the art. Further, the relation between the signal power of the first mode and the second mode may be varied. Such and other obvious modifications must be considered to be within the scope of the present invention, as it is defined by the appended claims.

What is claimed is:

1. A radar level gauge system for gauging the level of a filling material in a container, comprising:
   a waveguide extending towards the surface of said filling material;
   a transmitter for transmitting a microwave signal of a first mode of propagation in the waveguide;
   a receiver for receiving the microwave signal reflected against the surface of said filling material and propagating back through said waveguide; and
   processing circuitry for determining the filling level of the container based on said reflected microwave signal; and
   a transition element connecting the waveguide and the transmitter, wherein said transition element is configured to allow a part of the transmitted microwave signal to leak into a second mode of propagation;
   wherein said first and second modes of propagation are within a frequency band which admits propagation of said microwave signal in said two different modes of propagation in said waveguide, and wherein said receiver is arranged to receive said microwave signal in said at least two different modes of propagation.

2. The radar level gauge system of claim 1, for gauging the level of a liquid in a container, above which level a gas exists, wherein the waveguide extends through said gas towards the surface of said liquid.

3. The radar level gauge system of claim 1, wherein the first mode of propagation is a $H_{01}$ mode, and the second mode of propagation is a $H_{02}$ mode.

4. The radar level gauge system of claim 3, wherein the waveguide has a dimension that will not allow a $H_{03}$ mode to pass.

5. The radar level gauge system of claim 1, wherein the transition element is configured to leak 20-80% of the microwave power to the second mode of propagation.

6. The radar level gauge system of claim 1, wherein the transition element is configured to leak 40-60% of the microwave power to the second mode of propagation.

7. The radar level gauge system of claim 1, wherein the transition element is formed essentially as a cone.

8. The radar level gauge system of claim 7, wherein the length of the transition element in the axial direction is less than 0.25 m.

9. The radar level gauge system of claim 7, wherein the length of the transition element in the axial direction is within the range 0.05-0.10 m.

10. The radar level gauge system of claim 1, wherein said processing circuitry is arranged to estimate from the reflected microwave signal in each mode of propagation one or more properties of the waveguide or of the environment in said container, and to use said estimate of said one or more properties to calculate a corrected level of said filling material in said container.

11. The radar level gauge system of claim 10, wherein said one or more properties of the waveguide or of the environment in said container comprises a cross-sectional dimension of said waveguide, a variation in a cross-sectional dimension along the length of said waveguide, a concentricity measure of said waveguide, presence of impurities, particularly solid or liquid hydrocarbons, at the inner walls of said waveguide, or presence of mist in the tank.

12. The radar level gauge system of claim 1, wherein a reflecting reactance is arranged in said waveguide to give a substantially stronger reflex of the microwave signal in one of said at least two different modes of propagation than in an other one of said at least two different modes of propagation.

13. A method for gauging the level of a filling material in a container, comprising the steps of:
- transmitting a microwave signal of a first mode of propagation through a waveguide towards the surface of said filling material;
- receiving the microwave signal reflected against the surface of said filling material and propagating back through said waveguide; and
- determining the filling level of the container based on said reflected microwave signal, wherein:
- a part of said transmitted microwave signal is allowed to leak into a second mode of propagation, both the first and the second mode being within a frequency band which admits propagation of said microwave signal in said waveguide; and
- said microwave signal is received in said two different modes of propagation.

14. The method of claim 13, for gauging the level of a liquid in a container, above which level a gas exists, wherein the waveguide extends through said gas towards the surface of said liquid.

15. The method of claim 13, wherein the first mode of propagation is a $H_{01}$ mode, and the second mode of propagation is a $H_{02}$ mode.

16. The method of claim 15, wherein leakage into a $H_{03}$ mode is inhibited.

17. The method of claim 13, wherein 20-80% of the microwave power leaks into the second mode of propagation.

18. The method of claim 17, wherein 40-60% of the microwave power leaks into the second mode of propagation.

19. The method of claim 13, wherein leakage into the second mode of propagation occurs within a transition element formed essentially as a cone.

20. The method of claim 19, wherein the length of the transition element in the axial direction is less than 0.25 m.

21. The method of claim 13, wherein the reflected microwave signal in each mode of propagation are used for estimation of one or more properties of the waveguide or of the environment in said container, and to use said estimate of said one or more properties to calculate a corrected level of said filling material in said container.

22. The method of claim 21, wherein said one or more properties of the waveguide or of the environment in said container comprises a cross-sectional dimension of said waveguide, a variation in a cross-sectional dimension along the length of said waveguide, a concentricity measure of said waveguide, presence of impurities, particularly solid or liquid hydrocarbons, at the inner walls of said waveguide, or presence of mist in the tank.

23. The radar level gauge system of claim 13, wherein a reflecting reactance is arranged in said waveguide to give a substantially stronger reflex of the microwave signal in one of said at least two different modes of propagation than in an other one of said at least two different modes of propagation.

* * * * *